United States Patent
Une et al.

(10) Patent No.: US 7,903,963 B2
(45) Date of Patent: Mar. 8, 2011

(54) IMAGE CAPTURING APPARATUS, IMAGE CAPTURING METHOD, AND PROGRAM

(75) Inventors: Hideho Une, Tokyo (JP); Koichiro Ishigami, Kanagawa (JP)

(73) Assignee: Sony Corporation (JP)

( * ) Notice: Subject to any disclaimer, the term of this patent is extended or adjusted under 35 U.S.C. 154(b) by 262 days.

(21) Appl. No.: 12/077,118

(22) Filed: Mar. 17, 2008

(65) Prior Publication Data
US 2008/0247744 A1    Oct. 9, 2008

(30) Foreign Application Priority Data
Mar. 29, 2007   (JP) ................................ P2007-088215

(51) Int. Cl.
*G03B 17/24* (2006.01)
(52) U.S. Cl. ..................................... 396/310; 348/231.3
(58) Field of Classification Search .................. 396/310; 348/231.3
See application file for complete search history.

(56) References Cited

U.S. PATENT DOCUMENTS

| 5,434,637 | A | * | 7/1995 | Ohta .............................. 396/529 |
| 5,600,371 | A | * | 2/1997 | Arai et al. ...................... 348/335 |
| 5,712,947 | A |   | 1/1998 | Oguro et al. |
| 7,042,499 | B1 | * | 5/2006 | Kido et al. ................ 348/211.14 |
| 2003/0048374 | A1 | * | 3/2003 | Minakuti et al. .............. 348/360 |
| 2007/0098385 | A1 | * | 5/2007 | Tanaka et al. ................... 396/56 |
| 2007/0104474 | A1 | * | 5/2007 | Tamura .......................... 396/91 |

FOREIGN PATENT DOCUMENTS

| JP | 4-280239 A | 10/1992 |
| JP | 06-113253 A | 4/1994 |
| JP | 07-098965 A | 4/1995 |
| JP | 2001-111963 A | 4/2001 |
| JP | 2003-319296 A | 11/2003 |
| JP | 2005-277958 A | 10/2005 |
| JP | 2005-287062 A | 10/2005 |
| JP | 2005-293339 A | 10/2005 |
| JP | 2005-323276 A | 11/2005 |
| JP | 2006-279458 A | 10/2006 |

* cited by examiner

*Primary Examiner* — Rochelle-Ann J Blackman
*Assistant Examiner* — Fang-Chi Chang
(74) *Attorney, Agent, or Firm* — Lerner, David, Littenberg, Krumholz & Mentlik, LLP

(57) ABSTRACT

An image capturing apparatus whose lens unit can be attached to and detached from a camera body section includes: an image-capturing signal processing section that generates an image signal by performing an image capturing process of subject light introduced via the lens unit; an attachment detecting section that generates a detection signal indicating whether or not the lens unit is attached to the camera body section; and a control section that determines whether or not the lens unit has been interchanged or detached and attached by using the detection signal, and performs a process of forming index data with respect to the image signal on the basis of a result of the determination.

8 Claims, 18 Drawing Sheets

FIG. 12A

INDEX INFORMATION FILE

| INDEX NO. | IDX (SECTOR ADDRESS) |
|---|---|
| 1 | 000000 |
| 2 | 00008F |
| 3 | 0003C0 |
| ⋮ | ⋮ |

FIG. 12B

INDEX INFORMATION FILE

| INDEX NO. | IDX (TIME CODE) |
|---|---|
| 1 | 00:00:00 |
| 2 | 00:18:04 |
| 3 | 01:02:43 |
| ⋮ | ⋮ |

FIG. 12C

INDEX INFORMATION FILE

| INDEX NO. | IDX (FRAME NUMBER) |
|---|---|
| 1 | 0 |
| 2 | 67323 |
| 3 | 115738 |
| ⋮ | ⋮ |

FIG. 14A

INDEX INFORMATION FILE

| INDEX NO. | IDX (THUMBNAIL IMAGE DATA) | IDX (FRAME NUMBER) |
|---|---|---|
| 1 | TM1 | 0 |
| 2 | TM2 | 67323 |
| 3 | TM3 | 115738 |
| ⋮ | ⋮ | ⋮ |

FIG. 14B

INDEX INFORMATION FILE                    IDX

| INDEX NO. | IDX (FRAME NUMBER) | THUMBNAIL POINTER |
|---|---|---|
| 1 | 0 | P1 |
| 2 | 67323 | P2 |
| 3 | 115738 | P3 |
| ⋮ | | |

P1 → TM1
P2 → TM2
P3 → TM3

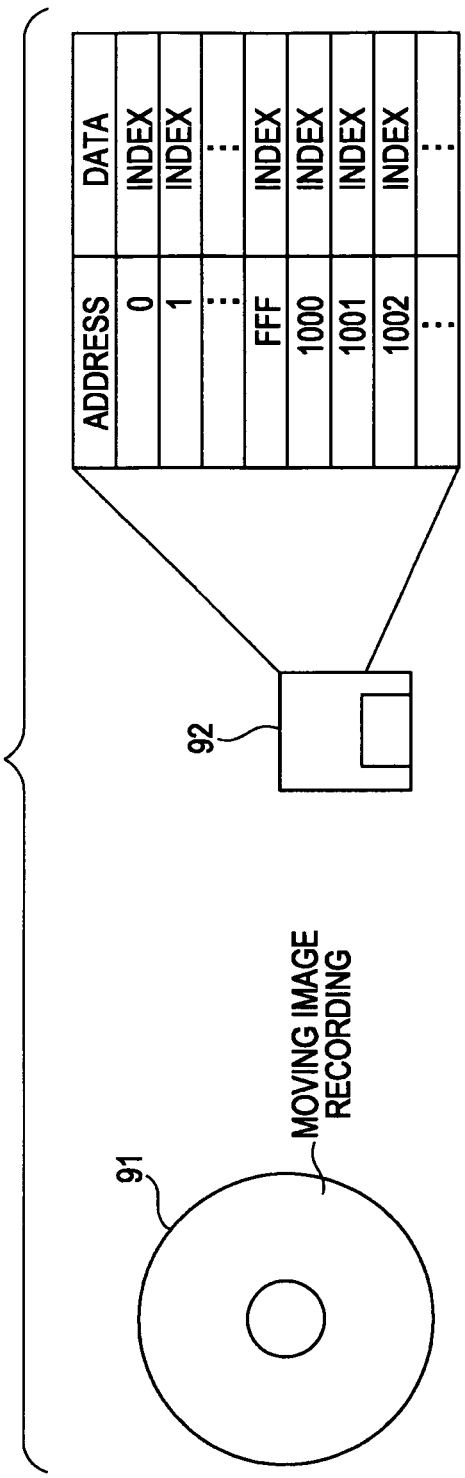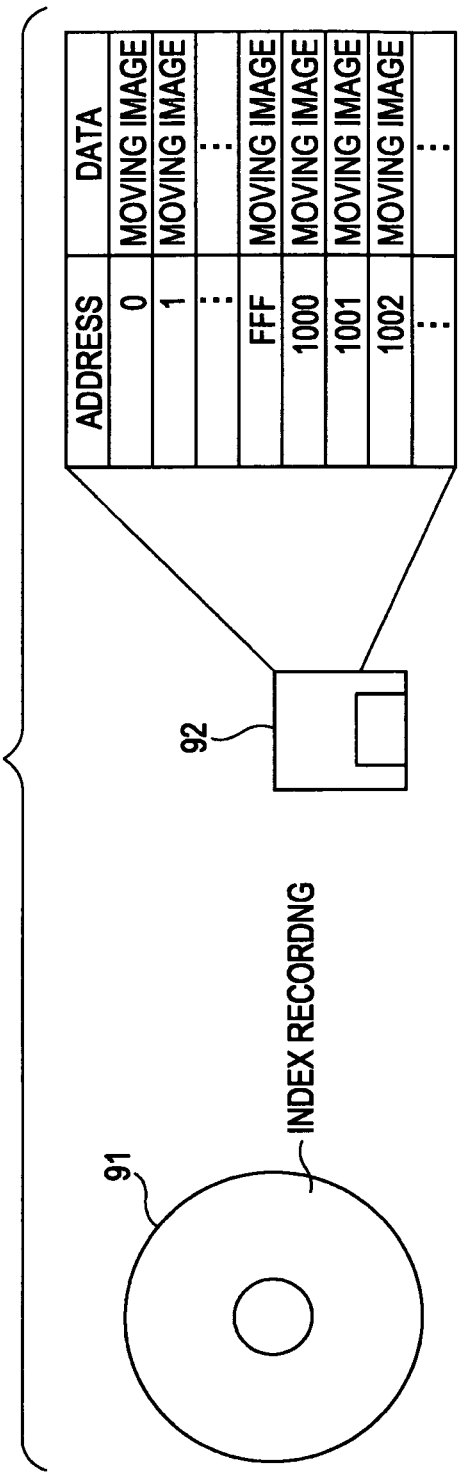

IMAGE CAPTURING APPARATUS, IMAGE CAPTURING METHOD, AND PROGRAM

CROSS REFERENCES TO RELATED APPLICATIONS

The present invention contains subject matter related to and claims the benefit of the filing date of Japanese Patent Application JP 2007-088125 filed in the Japanese Patent Office on Mar. 29, 2007, the entire contents of which are incorporated herein by reference.

BACKGROUND OF THE INVENTION

1. Field of the Invention

The present invention relates to an image capturing apparatus, an image capturing method, and a program that can be applied to an image capturing apparatus. More specifically, the present invention relates to an image capturing apparatus whose lens unit can be attached and detached.

2. Description of the Related Art

A technique for recording index data with respect to a moving image for quick access to a desired scene of the moving image is disclosed in Japanese Unexamined Patent Application Publication No. 7-98965 (and the corresponding U.S. Pat. No. 5,712,947), Japanese Unexamined Patent Application Publication No. 6-113253, and Japanese Unexamined Patent Application Publication No. 2005-287062.

Adding and recording index data with respect to a moving image enables efficient access to a scene. In this connection, there is a demand for a more suitable technique for assigning this index data.

SUMMARY OF THE INVENTION

It is desirable to provide a suitable technique for assigning index data in an image capturing apparatus whose lens unit can be attached and detached.

According to an embodiment of the present invention, there is provided an image capturing apparatus whose lens unit can be attached to and detached from a camera body section, including: an image-capturing signal processing section that generates an image signal by performing an image capturing process of subject light introduced via the lens unit; an attachment detecting section that generates a detection signal indicating whether or not the lens unit is attached to the camera body section; and a control section that determines whether or not the lens unit has been interchanged or detached and attached by using the detection signal, and performs a process of forming index data with respect to the image signal on the basis of a result of the determination.

The image capturing apparatus may further include a recording section that records the image signal onto a recording medium, and as the process of forming index data, the control section may cause the recording section to record index data with respect to the image signal recorded in the recording section, onto the recording medium after interchange or detachment and attachment of the lens unit.

The image capturing apparatus may further include a transmitting section that transmits the image signal generated by the image-capturing signal processing section to external equipment, and as the process of forming index data, the control section may cause the transmitting section to transmit index data with respect to the image signal transmitted from the transmitting section, to the external equipment after interchange or detachment and attachment of the lens unit.

The control section may determine whether or not the lens unit has been interchanged by using the detection signal and identification information of the lens unit that is being attached, and upon determining that the lens unit has been interchanged, the control section may perform the process of forming index data with respect to the image signal.

The control section may determine whether or not the lens unit has been detached and attached by monitoring a change in the detection signal, and upon determining that the lens unit has been detached and attached, the control section may perform the process of forming index data with respect to the image signal.

The control section may perform a control of generating still image data used for retrieving the image signal.

According to an embodiment of the present invention, there is provided an image capturing method for an image capturing apparatus whose lens unit can be attached to and detached from a camera body section, including the steps of: generating an image signal by performing an image capturing process of subject light introduced via the lens unit; determining whether or not the lens unit has been interchanged or detached and attached by using a detection signal indicating whether or not the lens unit is attached to the camera body section; and performing a process of forming index data with respect to the image signal generated by the image capturing process, on the basis of a result of the determination of whether or not the lens unit has been interchanged or detached and attached.

According to an embodiment of the present invention, there is provided a program for causing a control section to execute an image capturing method for an image capturing apparatus whose lens unit can be attached to and detached from a camera body section, the image capturing method including the steps of: generating an image signal by performing an image capturing process of subject light introduced via the lens unit; determining whether or not the lens unit has been interchanged or detached and attached by using a detection signal indicating whether or not the lens unit is attached to the camera body section; and performing a process of forming index data with respect to the image signal generated by the image capturing process, on the basis of a result of the determination of whether or not the lens unit has been interchanged or detached and attached.

BRIEF DESCRIPTION OF THE DRAWINGS

FIGS. 12A to 12C are explanatory diagrams of the contents of index data according to an embodiment;

FIGS. 14A and 14B are explanatory diagrams of the contents of index data according to an embodiment;

FIGS. 16A and 16B are explanatory diagrams of the recording locations of an image signal and index data according to an embodiment;

DESCRIPTION OF THE PREFERRED EMBODIMENTS

Embodiments of the present invention will be described below in the following order of topics.
[1. Configuration and Operation of Image Capturing Apparatus according to First Embodiment]
[2. Configuration and Operation of Image Capturing Apparatus according to Second Embodiment]
[3. Configuration and Operation of Image Capturing Apparatus according to Third Embodiment]
[4. Example of Index Data Contents]
[5. Example of Index Data Recording]
[6. Advantages of Embodiments and Program]

Figure 1:
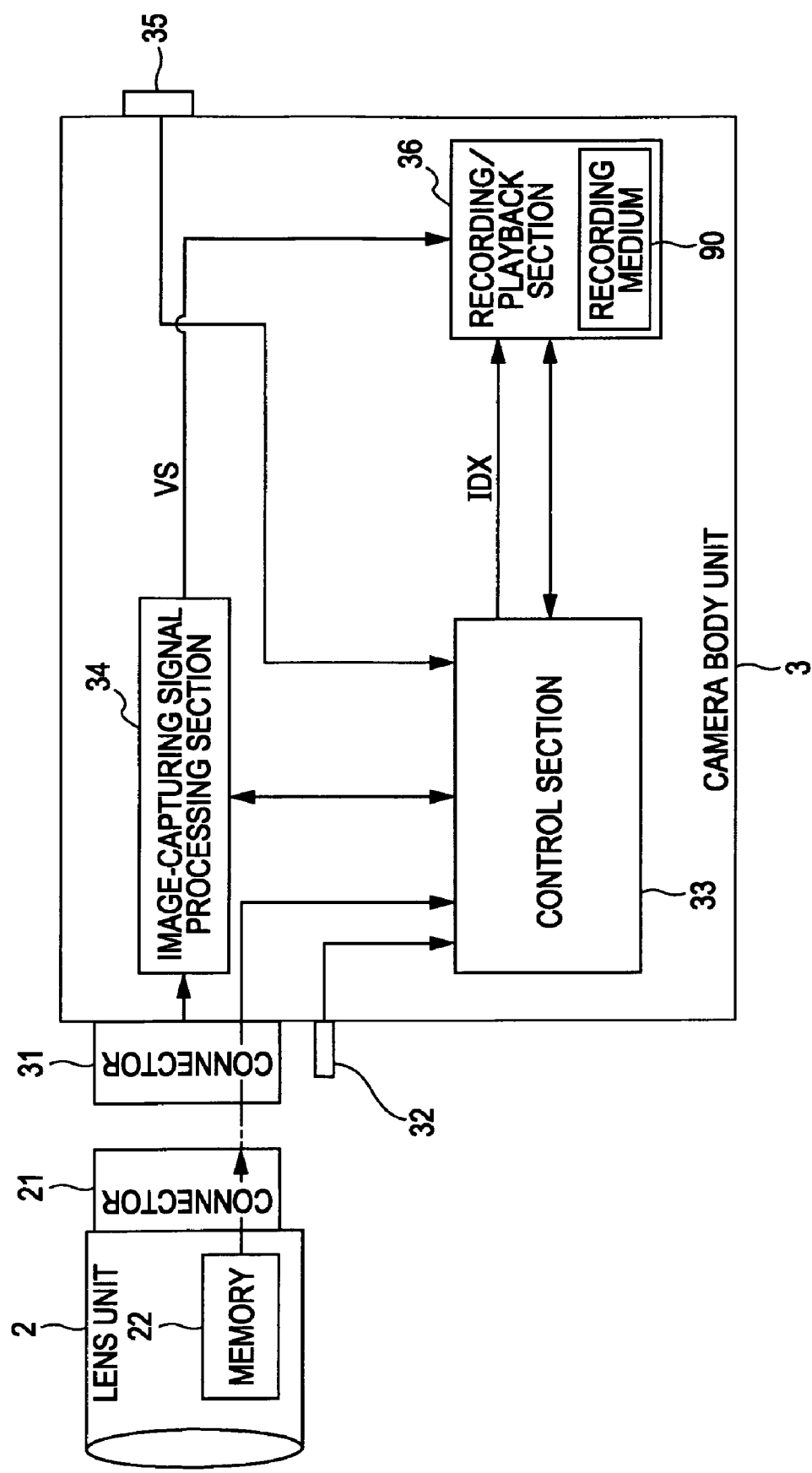
FIG. 1 is a block diagram of an image capturing apparatus according to a first embodiment of the present invention.

1. Configuration and Operation of Image Capturing Apparatus according to First Embodiment FIG. 1 shows the configuration of an image capturing apparatus 1 according to a first embodiment.

The image capturing apparatus 1 according to this embodiment is configured so that a lens unit 2 can be attached to and detached from a camera body section 3. The lens unit 2 has an image-capturing optical system including an image capturing lens or an optical filter. That is, in the image capturing apparatus 1 according to this embodiment, an image-capturing optical system for introducing subject light as the lens unit 2 is interchangeable.

The lens unit 2 has a connector section 21, and can be attached to and detached from a connector section 31 of the camera body section 3. The connector section 21, 31 has a mechanical mechanism formed for attaching the lens unit 2, and a terminal section for effecting an electrical-signal connection between the camera body section 3 and the lens unit 2.

The lens unit 2 contains a memory section 22 including, for example, a non-volatile solid-state memory such as a flash memory or a ROM. A lens ID is stored in the memory section 22. A lens ID refers to identification information indicating the kind type of a lens unit.

The camera body section 3 has an attachment detecting section 32. The attachment detecting section 32 generates a detection signal indicating whether or not the lens unit 2 is attached. The attachment detecting section 32 can be formed by, for example, an optical sensor mechanism using a mechanical switch, a photo coupler, or the like.

An image-capturing signal processing section 34 generates an image signal by performing an image capturing process of subject light introduced via the lens unit 2.

That is, the image-capturing signal processing section 34 includes an image capturing device section such as a CCD sensor array, a CMOS sensor array, or an image capturing tube, an analog front end, a digital image processing circuit, a timing generator for controlling the operation of the image capturing device section, and the like. In the image-capturing signal processing section 34, the image capturing device section converts subject light into an electrical signal, and the analog front end performs CDS (correlated double sampling) processing and gain processing with respect to the electrical signal obtained by the image capturing device section, followed by A/D conversion processing to obtain digital data. Further, the digital image signal processing circuit performs luminance processing, color signal processing, various kinds of correction processing, white balance processing, and the like to generate an image signal VS due to image capture.

The image signal VS generated by the image-capturing signal processing section 34 is supplied to a display section (not shown) (a viewfinder or the like) and displayed on an image capturing monitor, and is also supplied to a recording/playback section 36.

The recording/playback section 36 executes recording and playback of the image signal VS or various kinds of information onto and from a recording medium 90. Various kinds of recording medium, such as an optical disc, an HDD (Hard Disk Drive), a memory card with a built-in non-volatile solid-state memory such as a flash memory, and a magnetic tape, are assumed as examples of the recording medium 90.

At the time of image capture, the recording/playback section 36 performs compression encode processing, encode processing according to the format of record data, or the like with respect to the supplied image signal VS, and records the encoded data onto the recording medium 90.

Further, the recording/playback section 36 performs recording of index data and various kinds of other such additional data on the basis of control by a control section 33.

Further, the recording/playback section 36 can also play back an image signal recorded on the recording medium 90 for display on the display section (not shown).

An operating section 35 has various operating elements for the user to perform operations. For example, operating elements for performing such operations as starting and ending of image capture, switching between various modes, and playback are formed. Information on operations made with the various operating elements of the operating section 35 is supplied to the control section 33.

The control section 33 is formed by, for example, a microcomputer having a CPU (Central Processing Unit), a ROM (Read Only Memory), a RAM (Random Access Memory), a flash memory, and the like, and controls the overall operation of the image capturing apparatus. For example, in accordance with a user's operation on the operating section 35, the control section 33 controls image-capturing and signal processing operations in the image-capturing signal processing section 34, or a recording/playback operation in the recording/playback section 36.

Further, the control section 33 is configured to be capable of detecting whether or not the lens unit 2 is attached, by monitoring a detection signal of the attachment detecting section 32.

In this embodiment, in particular, the control section 33 also performs a control process of causing the recording/playback section 36 to record index data IDX onto the recording medium 90.

A program for causing this control process to be executed is stored in the ROM of the control section 33. On the basis of this program, computation/control processing necessary for performing the respective controls mentioned above is executed.

Figure 2:
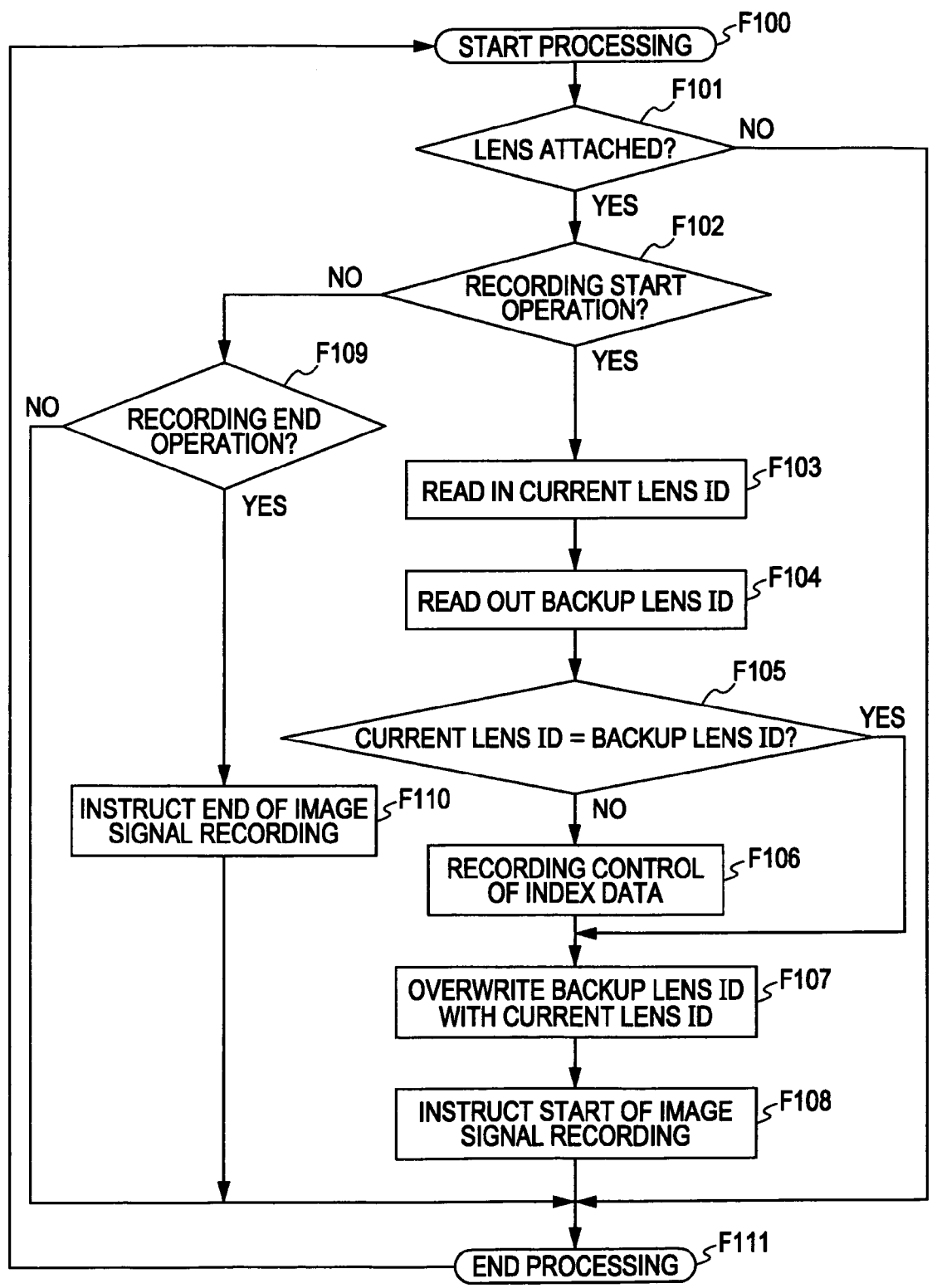
FIG. 2 is a flowchart of processing according to the first embodiment.

FIG. 2 shows an example of the control processing of the control section 33 related to the start/end of recording at the time of image capture and the recording of index data IDX in the image capturing apparatus 1 configured as described above.

In the flowchart of FIG. 2, the process from the start of processing in step F100 to the end of processing in step F111 is depicted as being repeatedly executed.

At the start of processing in FIG. 2, in step F101, the control section 33 determines whether or not the lens unit 2 is attached. That is, by checking a detection signal from the attachment detecting section 32, the control section 33 determines whether or not the lens unit 2 is mounted. If the lens unit 2 is not attached, processing is ended in step F111, and the process returns to the starting of processing in step F100 again.

If it is confirmed in step F111 that the lens unit 2 is attached, in step F102, F109, the control section 33 checks a user's operation on the operating section 35.

In step F102, the control section 33 checks whether or not a recording start operation has been made. In step F109, the control section 33 checks whether or not a recording end operation has been made.

In the state with the lens unit 2 attached, the process proceeds in the order of steps F102, F109, and F111 in the period prior to the start of recording of the captured image signal VS by the recording/playback section 36, and in the period during the execution of recording.

On the other hand, if a recording start operation by the user is detected, the process proceeds from step F102 to F103 where the control section 33 reads in the current lens ID first. That is, the control section 33 reads in the lens ID stored in the memory section 22 of the lens unit 2 being attached at this point, via the connector 21, 31.

In step F104, the control section 33 reads out a backup lens ID. For example, in the control section 33, a backup lens ID is stored in its internal flash memory or the like, and the control section 33 reads this backup lens ID stored therein. A backup lens ID refers to the lens ID of the lens unit 2 that was attached at the time of the last recording.

In step F105, the control section 33 compares the lens ID of the current lens unit 2, and the backup lens ID with each other, and judges whether or not they match.

If the lens ID of the current lens unit 2 and the backup lens ID match, the process proceeds to step F107. If the lens IDS do not match, in step F106, the control section 33 performs a recording control of index data IDX. That is, the control section 33 generates index data IDX, and supplies the index data IDX to the recording/playback section 36 to be recorded onto the recording medium 90. Then, the process proceeds to step F107.

The data format and recording location of index data IDX will be described later.

In step F107, the control section 33 updates a backup lens ID. That is, in order to set the lens ID of the current lens unit 2 as the backup lens ID to be used at the time of the next recording, the control section 33 overwrites and updates the value of the lens ID to be retained as a backup lens ID with the lens ID of the current lens unit 2.

Then, in step F108, the control section 33 instructs the recording/playback section 36 to start recording of an image signal. In response to this instruction, the recording/playback section 36 starts an operation of recording an image signal VS supplied from the image-capturing signal processing section 34 onto the recording medium 90.

If it is detected that the user has made a recording end operation, the process proceeds from step F109 to step F110, where the control section 33 instructs the recording/playback section 36 to end the recording of an image signal. In response to this instruction, the recording/playback section 36 ends the operation of recording an image signal VS supplied from the image-capturing signal processing section 34 onto the recording medium 90.

By performing the above-mentioned processing in FIG. 2, recording of index data IDX is performed in response to the start of recording immediately after the lens unit 2 is interchanged.

That is, if the result of a comparison between the lens ID of the current lens unit 2 and a backup lens ID in step F105 indicates that the two IDs match, this means that recording is started with the same (same kind of) lens unit 2 as that used at the time of the last image recording. In this case, recording of index data IDX is not performed.

On the other hand, if the two IDs do not match, this means that the lens unit 2 has been interchanged with another kind of lens unit. In this case, index data IDX is recorded in response to the start of image capture.

Figure 3:
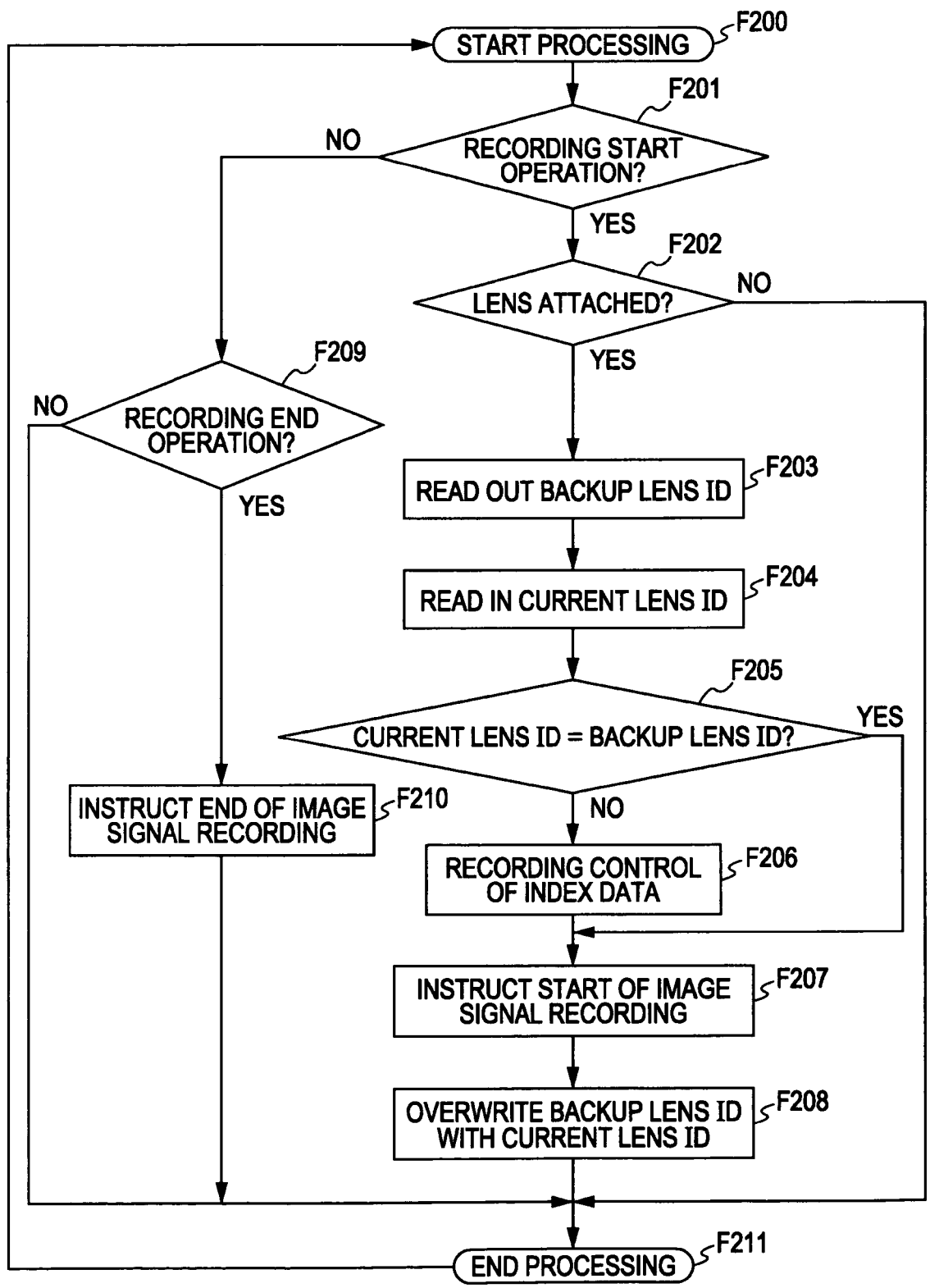
FIG. 3 is a flowchart of a modification of the processing according to the first embodiment.
Figure 4:
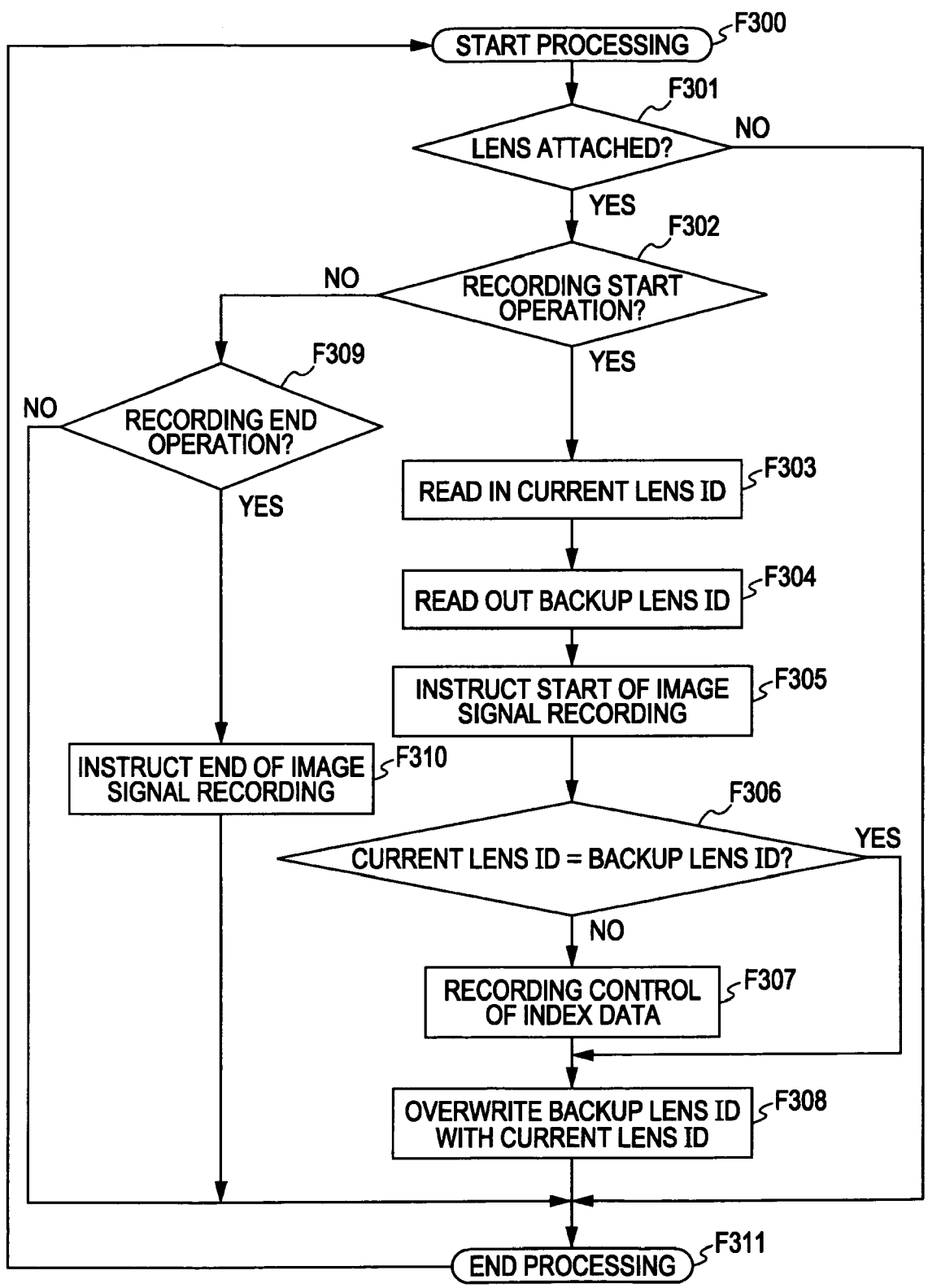
FIG. 4 is a flowchart of a modification of the processing according to the first embodiment.
Figure 5:
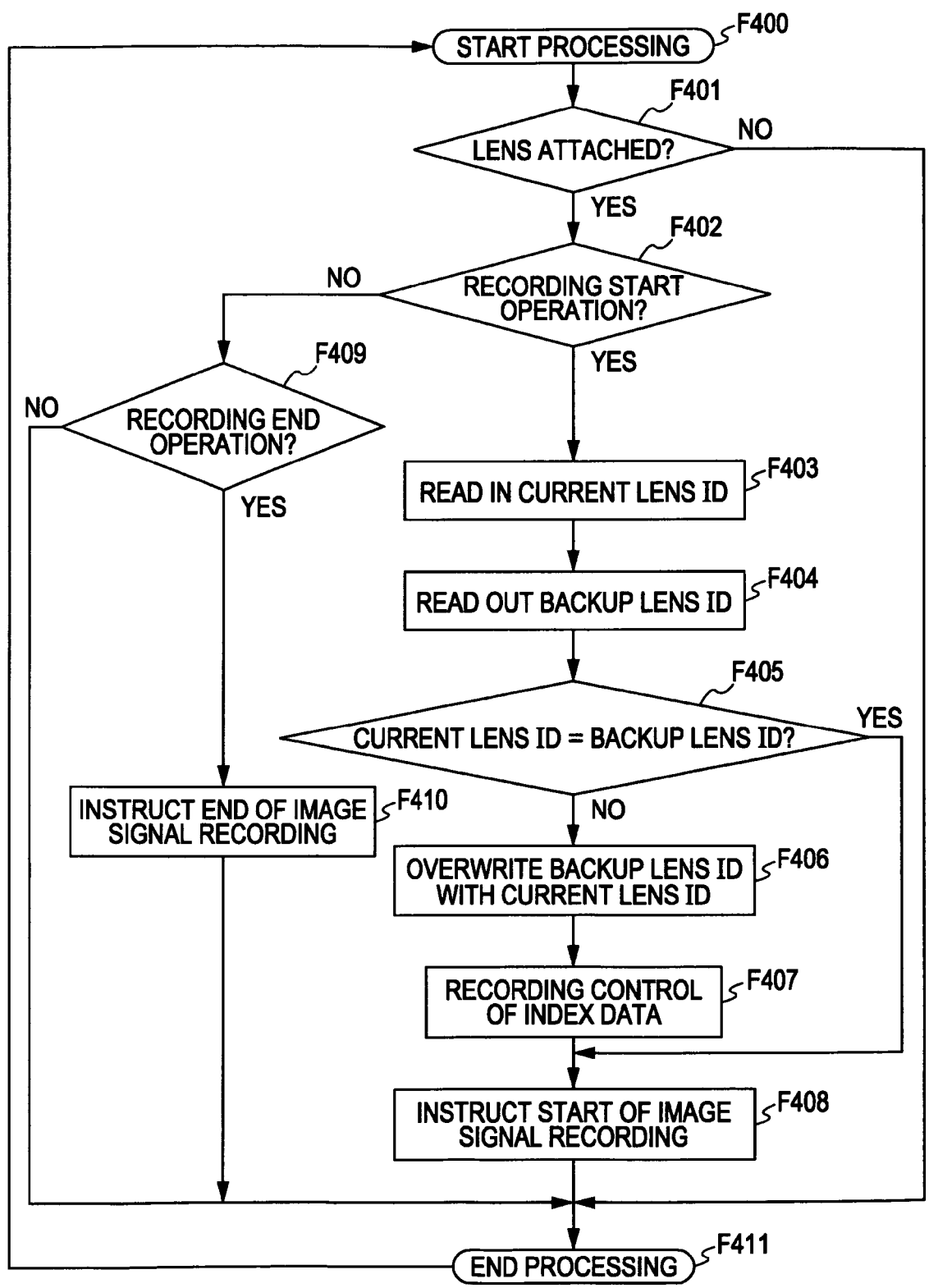
FIG. 5 is a flowchart of a modification of the processing according to the first embodiment.

Various modifications are conceivable with respect to the processing in FIG. 2, which are respectively illustrated in FIGS. 3, 4, 5.

In the example of processing in FIG. 3, upon starting processing in step F200, the control section 33 performs detection of a recording start operation and recording end operation in steps F201, F209. Then, upon detecting a recording start operation, the process proceeds from step F201 to step F202, and it is determined whether or not the lens unit 2 is attached. If the lens unit 2 is not attached, the process proceeds to step F211. If the lens unit 2 is attached, the process proceeds from step F202 to step F203, where the control section 33 reads out a backup lens ID, and in step F205, the control section 33 compares the lens ID of the current lens unit 2 and the backup lens ID with each other. If it is judged from the result of comparison that the lens unit 2 has been interchanged, in step F206, the control section 33 performs a recording control of index data IDX.

Then, in step F207, the control section 33 instructs the recording/playback section 36 to start recording of an image signal VS, and in step F208, the control section 33 updates the backup lens ID.

If a recording end operation is detected, the process proceeds from step F209 to step F210, where the control section 33 instructs the recording/playback section 36 to end the recording of the image signal VS.

The above-mentioned processing of steps F200 to F211 is repeated.

The example of processing shown in FIG. 3 differs from that of FIG. 2 in that the detection of whether or not the lens unit 2 is attached is performed after detection of a recording start operation, the order of the reading of a backup lens ID and the reading of the lens ID of the current lens unit 2 is reversed, and the order of the issuing of an instruction for starting image signal recording and the updating of a backup lens ID is changed.

Next, in the example of processing shown in FIG. 4, upon starting processing in step F300, in step F301, the control section 33 judges whether or not the lens unit 2 is attached. If the lens unit 2 is not attached, the process proceeds to step F311. If the lens unit 2 is attached, the control section 33 performs detection of a recording start operation and recording end operation in steps F302, F309.

Upon detecting a recording start operation, the process proceeds from step F302 to step F303, where the control section 33 reads the lens ID of the current lens unit 2, and in step F304, the control section 33 reads out a backup lens ID. Thereafter, in step F306, the control section 33 compares the lens ID of the current lens unit 2 and the backup lens ID with each other. If it is judged from the result of comparison that the lens unit 2 has been interchanged, in step F307, the control section 33 performs a recording control of index data IDX. Then in step F308, the control section 33 updates the backup lens ID.

If a recording end operation is detected, the process proceeds from step F309 to step F310, where the control section 33 instructs the recording/playback section 36 to end the recording of the image signal VS.

The above-mentioned processing of steps F300 to F311 is repeated.

That is, according to the example of processing in FIG. 4 described above, the determination as to whether or not the lens unit 2 has been interchanged through comparison of lens IDs, and the recording control of index data IDX in the case where the lens unit 2 has been interchanged, are performed after the start of recording of an image signal VS is instructed.

It should be noted that the control section 33 may instruct the recording/playback section 36 to start recording of an image signal VS before the current lens ID is read in and the backup lens ID is read out in steps F303, F304.

Next, in the example of processing shown in FIG. 5, upon starting processing in step F400, in step F401, the control section 33 judges whether or not the lens unit 2 is attached. If the lens unit 2 is not attached, the process proceeds to step F411. If the lens unit 2 is attached, the control section 33 performs detection of a recording start operation and recording end operation in steps F402, F409.

Upon detecting a recording start operation, the process proceeds from step F402 to step F403, where the control section 33 reads the lens ID of the current lens unit 2, and in step F404, the control section 33 reads out a backup lens ID. In step F405, the control section 33 compares the lens ID of the current lens unit 2 and the backup lens ID with each other. If it is judged from the result of comparison that the lens unit 2 has been interchanged, after performing an update of the backup lens ID in step F406, the control section 33 performs a recording control of index data IDX in step F407.

Then in step F408, the control section 33 instructs the recording/playback section 36 to start recording of an image signal VS.

If a recording end operation is detected, the process proceeds from step F409 to step F410, where the control section 33 instructs the recording/playback section 36 to end the recording of the image signal VS.

The above-mentioned processing of steps F400 to F411 is repeated.

That is, according to the example of processing in FIG. 5 described above, updating of a backup lens ID is performed only when it is determined that the lens unit 2 has been interchanged. This is because updating of a backup lens ID is unnecessary unless the lens unit 2 has been interchanged.

Through the above-described processing of FIGS. 3, 4, 5 as well, as in FIG. 2, a recording control of index data IDX is performed at the time of starting recording the first time-after the lens unit 2 is interchanged.

[2. Configuration and Operation of Image Capturing Apparatus According to Second Embodiment]

Figure 6:
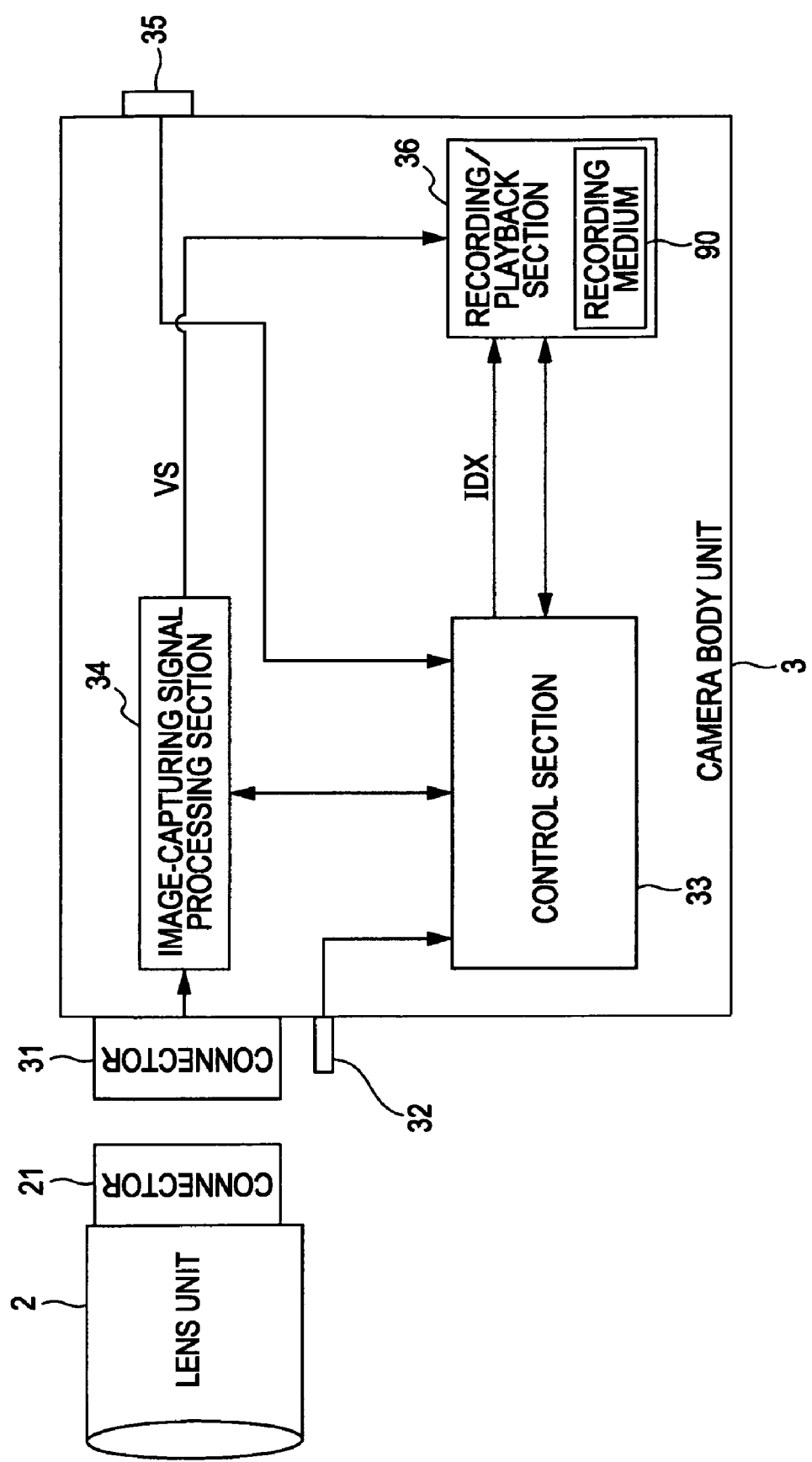
FIG. 6 is a block diagram of an image capturing apparatus according to a second embodiment.

FIG. 6 shows the configuration of the image capturing apparatus 1 according to a second embodiment. The portions that are the same as those of FIG. 1 are denoted by the same symbols and description thereof is omitted.

FIG. 6 illustrates an example of configuration in which a memory section for storing a lens ID is not provided in the lens unit 2, and the control section 33 of the camera body section 3 does not particularly perform a process of reading in a lens ID.

Figure 7:
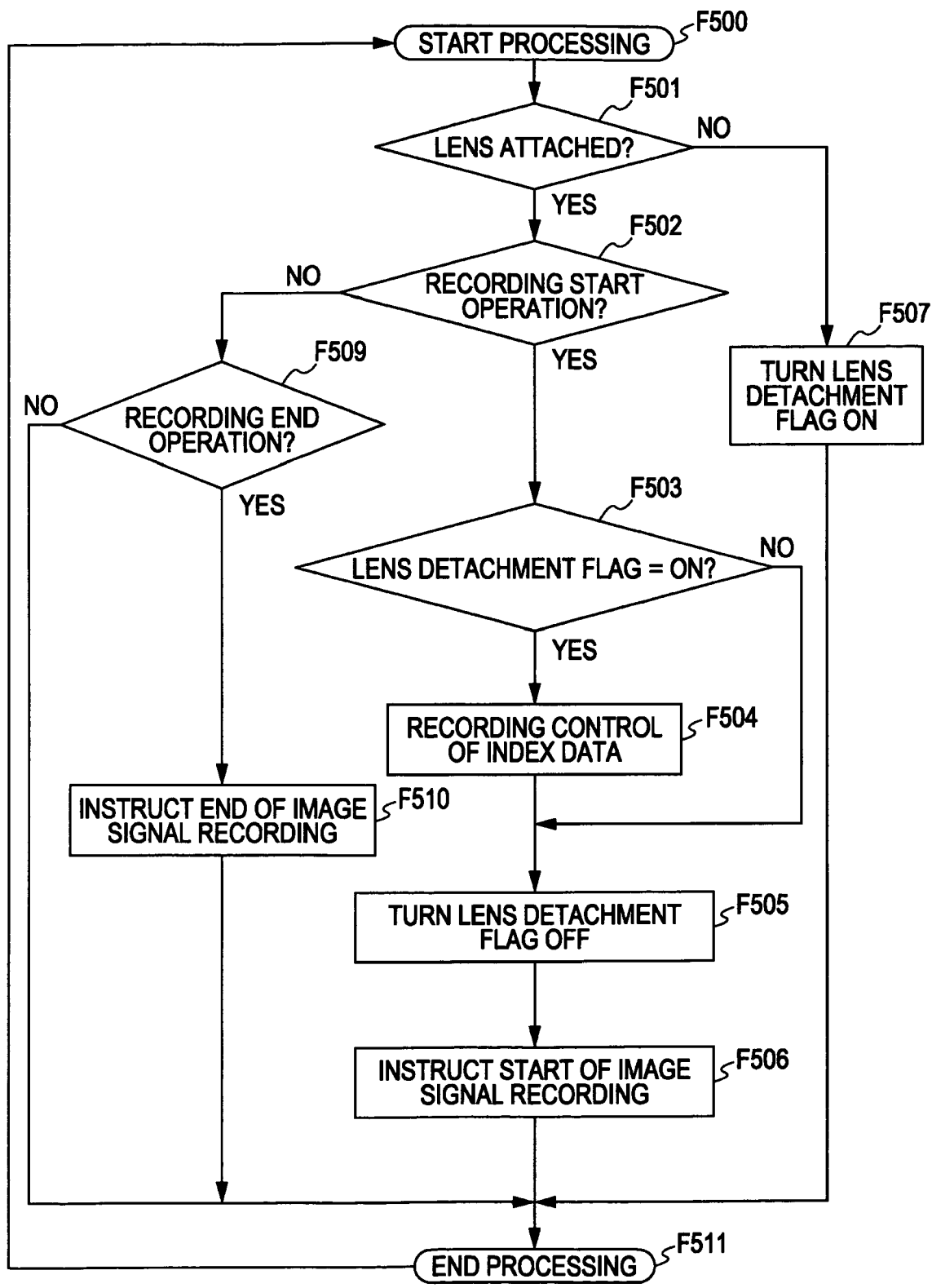
FIG. 7 is a flowchart of processing according to the second embodiment.

FIG. 7 shows an example of the control processing of the control section 33 related to the start/end of recording at the time of image capture and the recording of index data IDX in the image capturing apparatus 1 configured as described above. In the flowchart of FIG. 7, the process from the start of processing in step F500 to the end of processing in step F511 is depicted as being repeatedly executed.

At the start of the processing of FIG. 7, in step F501, the control section 33 determines whether or not the lens unit 2 is attached. That is, by checking a detection signal from the attachment detecting section 32, the control section 33 determines whether or not the lens unit 2 is mounted.

If the lens unit 2 is not attached, in step F507, the control section 33 turns a lens detachment flag as an internal flag ON. Then, processing is ended in step F511, and the process returns to the start of processing in step F500.

A lens detachment flag is a flag that is turned ON when the lens unit 2 is not being attached.

Upon confirming in step F501 that the lens unit 2 is attached, in step F502, F509, the control section 33 checks a user's operation on the operating section 35.

In step F502, the control section 33 checks whether or not a recording start operation has been made. In step F509, the control section 33 checks whether or not a recording end operation has been made.

In the state with the lens unit 2 attached, the process proceeds in the order of steps F502, F509, and F511 in the period prior to the start of recording of the captured image signal VS by the recording/playback section 36, and in the period during the execution of recording.

If a recording start operation by the user is detected, the process proceeds from step F502 to F503 where the control section 33 checks the lens detachment flag.

If the lens detachment flag is OFF, the process proceeds to step F505. If the lens detachment flag is ON, in step F504, the control section 33 performs a recording control of index data IDX. That is, the control section 33 generates index data IDX, and supplies the index data IDX to the recording/playback section 36 to be recorded onto the recording medium 90. Then, the process proceeds to step F505.

In step F505, the control section 33 performs a process of turning the lens detachment flag OFF, and in step F506, the control section 33 instructs the recording/playback section 36 to start recording of an image signal. In response to this instruction, the recording/playback section 36 starts an operation of recording an image signal VS supplied from the image-capturing signal processing section 34 onto the recording medium 90.

If it is detected that the user has made a recording end operation, the process proceeds from step F509 to step F510, where the control section 33 instructs the recording/playback section 36 to end the recording of an image signal. In response to this instruction, the recording/playback section 36 ends the operation of recording an image signal VS supplied from the image-capturing signal processing section 34 onto the recording medium 90.

By performing the above-mentioned processing in FIG. 7, recording of index data IDX is performed in response to the start of recording immediately after the lens unit 2 is detached and attached.

If the lens detachment flag is OFF in step F503, this means that removal and attachment of the lens unit 2 have not been performed during the period from the last image recording to the start of the current image recording. On the other hand, irrespective of whether the lens unit 2 has been interchanged with another kind of lens unit 2 or the same lens unit 2 has been removed once and then attached again, the lens detachment flag turns ON as long as the lens unit 2 has been detached and attached, and in step F504, a recording control of index data IDX is performed at the time of starting recording the first time after the detachment and attachment.

Figure 8:
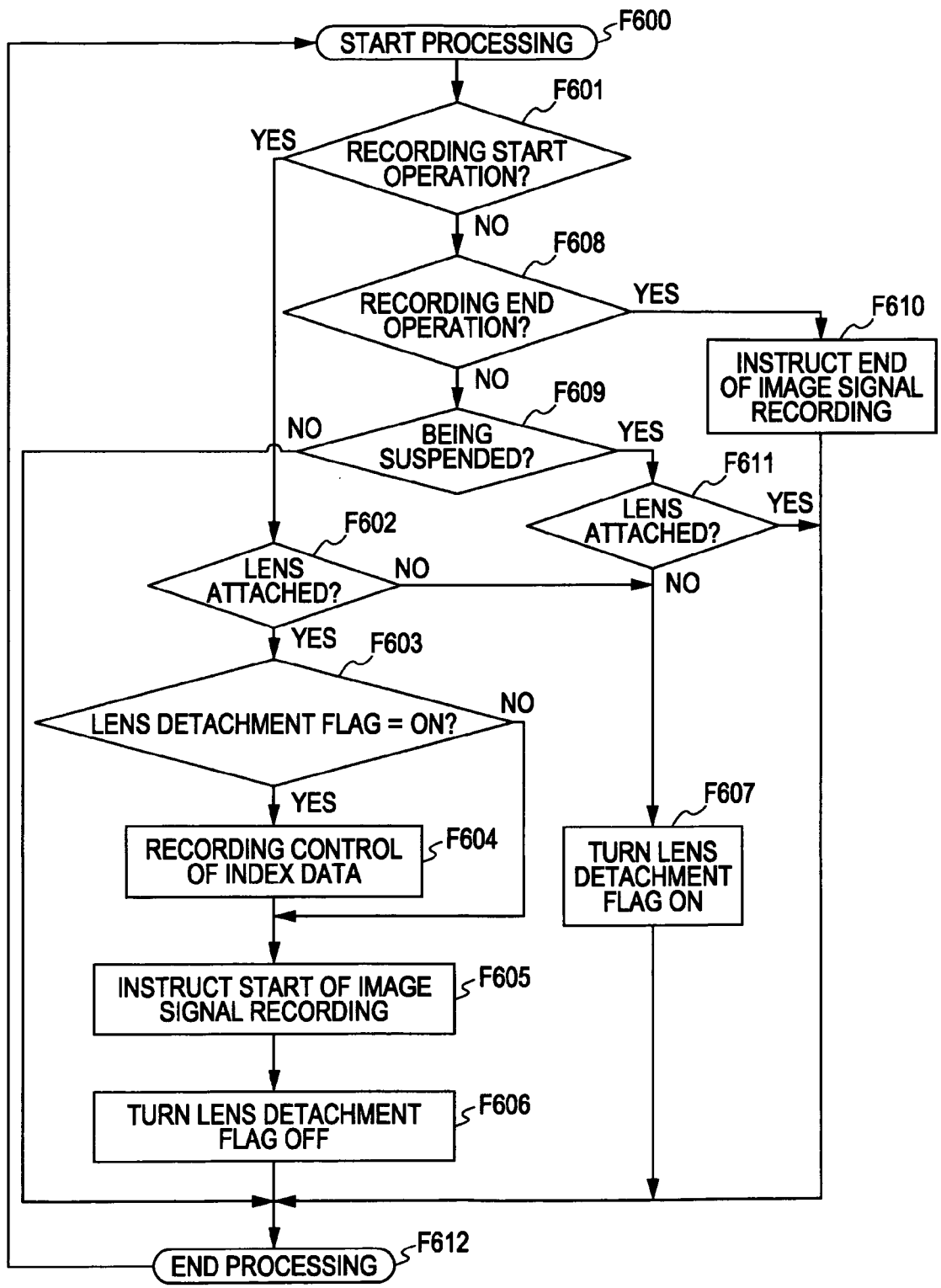
FIG. 8 is a flowchart of a modification of the processing according to the second embodiment.
Figure 9:
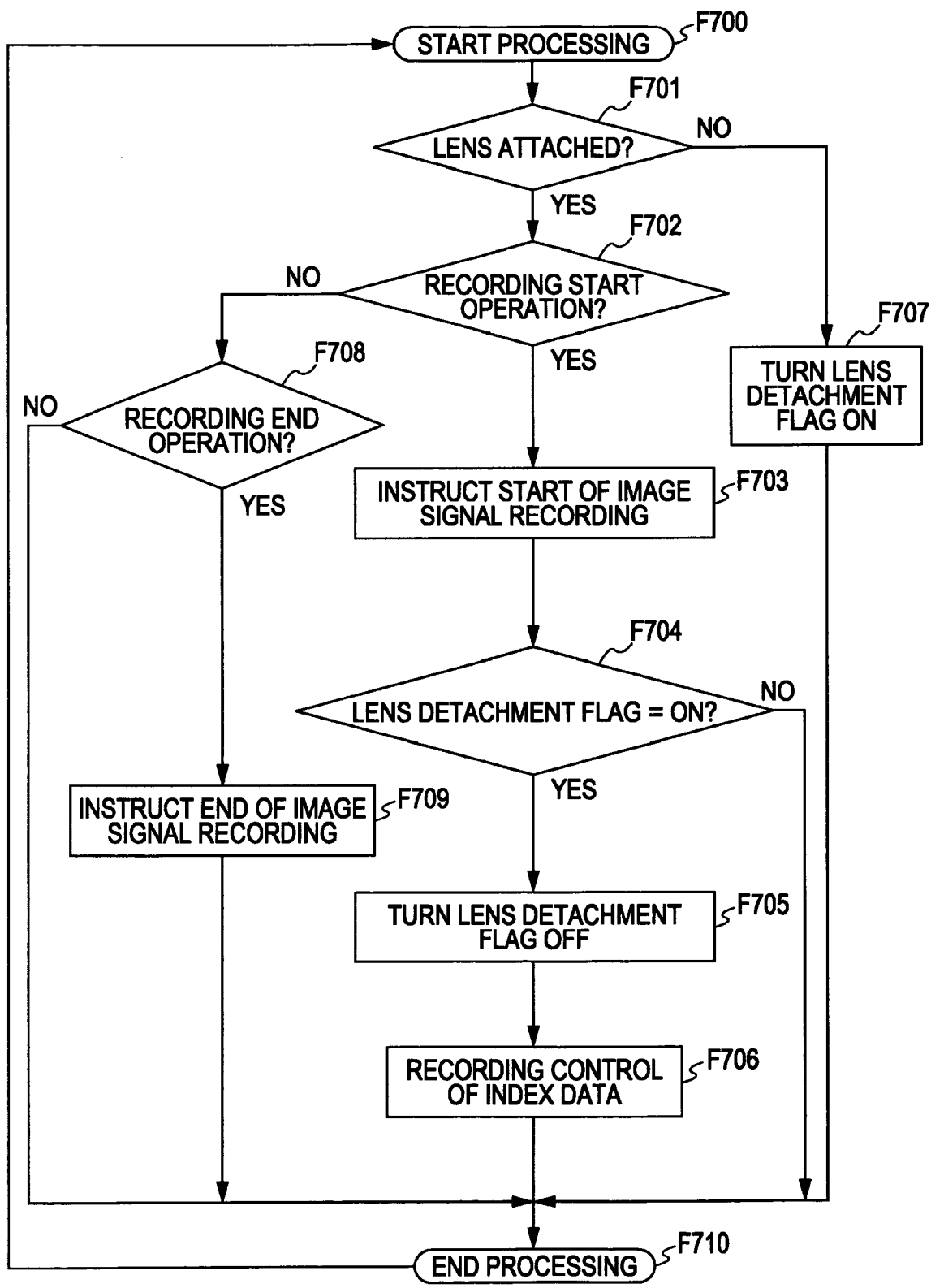
FIG. 9 is a flowchart of a modification of the processing according to the second embodiment.
Figure 10:
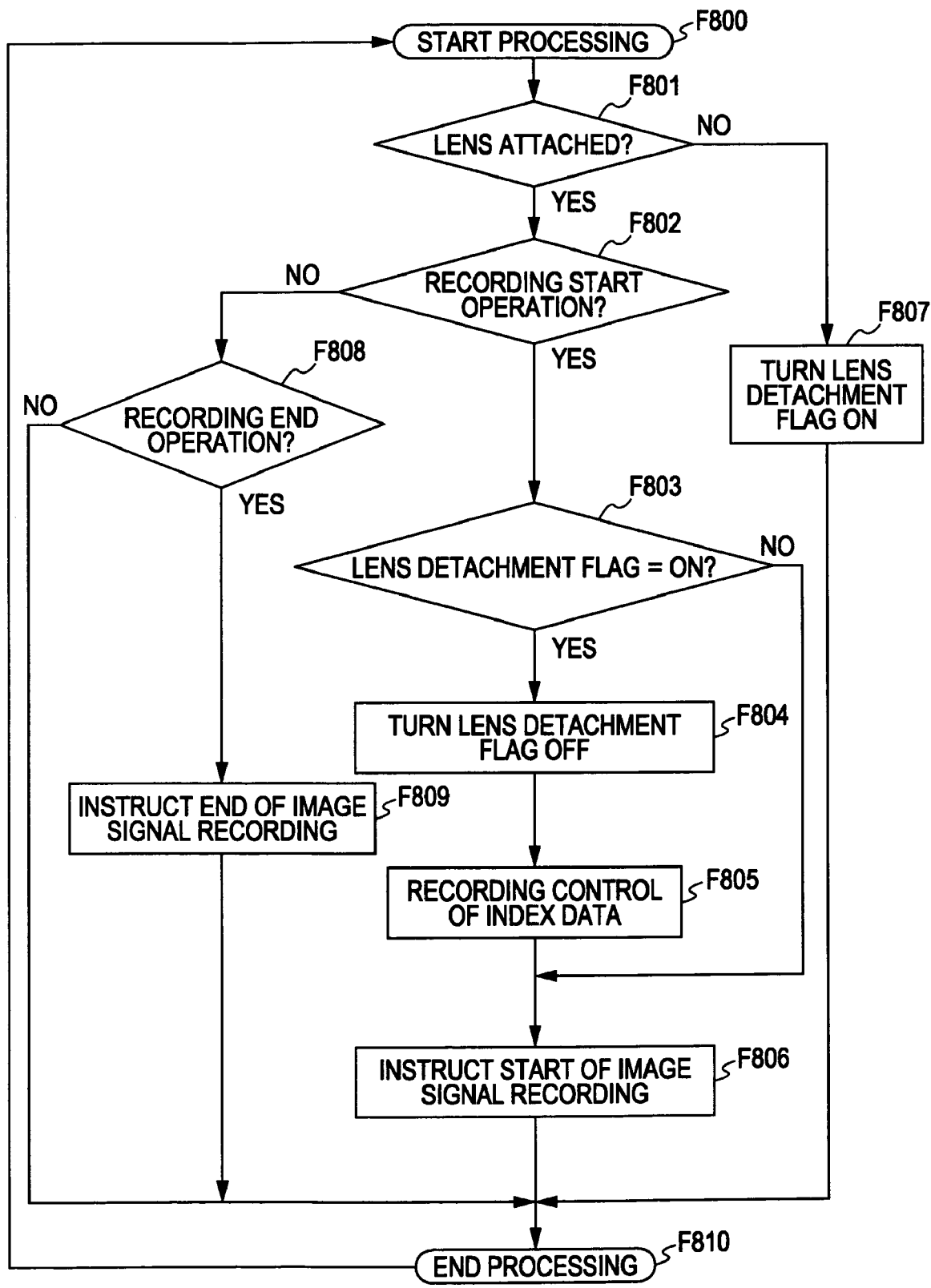
FIG. 10 is a flowchart of a modification of the processing according to the second embodiment.

Modifications of the processing shown in FIG. 7 are respectively illustrated in FIGS. 8, 9, 10.

In the example of processing shown in FIG. 8, upon starting processing in step F600, the control section 33 performs detection of a recording start operation and recording end operation in steps F601, F608. When neither a recording start operation nor a recording end operation is being made, it is assumed that recording is being executed or suspended, so the control section 33 judges in step F609 whether or not recording is being suspended.

In a situation where neither a recording start operation nor a recording end operation is detected, if recording is currently being suspended, in step F611, the control section 33 determines whether or not the lens unit 2 is attached. If the lens unit 2 is not attached, the control section 33 turns the lens detachment flag ON in step F607, and ends processing in step F612. If the lens unit 2 is attached, the process proceeds to step F612 as it is.

If a recording start operation is detected, the process proceeds from step F601 to step F602, where the control section determines whether or not the lens unit 2 is attached. If the lens unit 2 is not attached, the control section 33 turns the lens detachment flag ON in step F607, and ends processing in step F612. That is, in this case, no recording start control is performed, and the user's recording start operation is handled as an invalid operation.

Upon confirming attachment of the lens unit 2 after a recording start operation is detected, the process proceeds to step F603 where the control section 33 checks the lens detachment flag. If the lens detachment flag is ON, in step F604, the control section 33 performs a recording control of index data IDX.

Then, in step F605, the control section 33 instructs the recording/playback section 36 to start recording of an image signal, and in step F606, the control section 33 turns the lens detachment flag OFF.

If a recording end operation is detected, the process proceeds from step F608 to step F610, where the control section 33 instructs the recording/playback section 36 to end the recording of the image signal VS.

The above-mentioned processing of steps F600 to F612 is repeated.

The above-described example of processing shown in FIG. 8 differs from that of FIG. 7 mentioned above in that the detection of whether the lens unit 2 is attached is performed after detection of a recording start operation and during suspension, and that the order of the issuing of an instruction for starting image signal recording and the process of turning the lens detachment flag OFF is changed.

In the example of processing shown in FIG. 9, upon starting processing in step F700, in step F701, the control section 33 determines whether or not the lens unit 2 is attached. If the lens unit 2 is not attached, the control section 33 turns the lens detachment flag ON in step F707, and the process proceeds to step F710.

If the lens unit 2 is attached, the control section 33 performs detection of a recording start operation and recording end operation in steps F702, F703.

If a recording start operation is detected, the process proceeds from step F702 to step F703, where the control section 33 instructs the recording/playback section 36 to start recording of an image signal.

Then, in step F704, the control section 33 checks the lens detachment flag. If the lens detachment flag is ON, the control section 33 turns the lens detachment flag OFF in step F705, and performs a recording control of index data IDX in step F706.

If a recording end operation is detected, the process proceeds from step F708 to step F709, where the control section 33 instructs the recording/playback section 36 to end the recording of the image signal VS.

The above-mentioned processing of steps F700 to F710 is repeated.

According to the example of processing in FIG. 9 described above, the start of recording of an image signal VS is instructed first in response to a recording start operation, and thereafter the lens detachment flag is checked. If the lens detachment flag is ON, the lens detachment flag is turned OFF, and a recording control of index data IDX is performed.

It should be noted that the order of steps F705, F706 may be reversed.

In the example of processing shown in FIG. 10, upon starting processing in step F800, in step F801, the control section 33 determines whether or not the lens unit 2 is attached. If the lens unit 2 is not attached, the control section 33 turns the lens detachment flag ON in step F807, and the process proceeds to step F810.

If the lens unit 2 is attached, the control section 33 performs detection of a recording start operation and recording end operation in steps F802, F803.

If a recording start operation is detected, the process proceeds from step F802 to step F803, where the control section 33 checks the lens detachment flag. If the lens detachment flag is ON, the control section 33 turns the lens detachment flag OFF in step F804, and performs a recording control of index data IDX in step F805.

Then, in step F806, the control section 33 instructs the recording/playback section 36 to start recording of an image signal.

If a recording end operation is detected, the process proceeds from step F808 to step F809, where the control section 33 instructs the recording/playback section 36 to end the recording of the image signal VS.

The above-mentioned processing of steps F800 to F810 is repeated.

According to the example of processing in FIG. 10, the lens detachment flag is checked before the start of recording of an image signal VS is instructed, and if the lens detachment flag is ON, a process of turning the lens detachment flag OFF and a recording control of index data IDX are performed. It should be noted that the order of steps F804 and F805 may be reversed.

Through the above-described processing of FIGS. 8, 9, 10 as well, as in FIG. 7, a recording control of index data IDX is performed at the time of starting recording the first time after the lens unit 2 is detached and attached.

[3. Configuration and Operation of Image Capturing Apparatus According to Third Embodiment]

Figure 11:
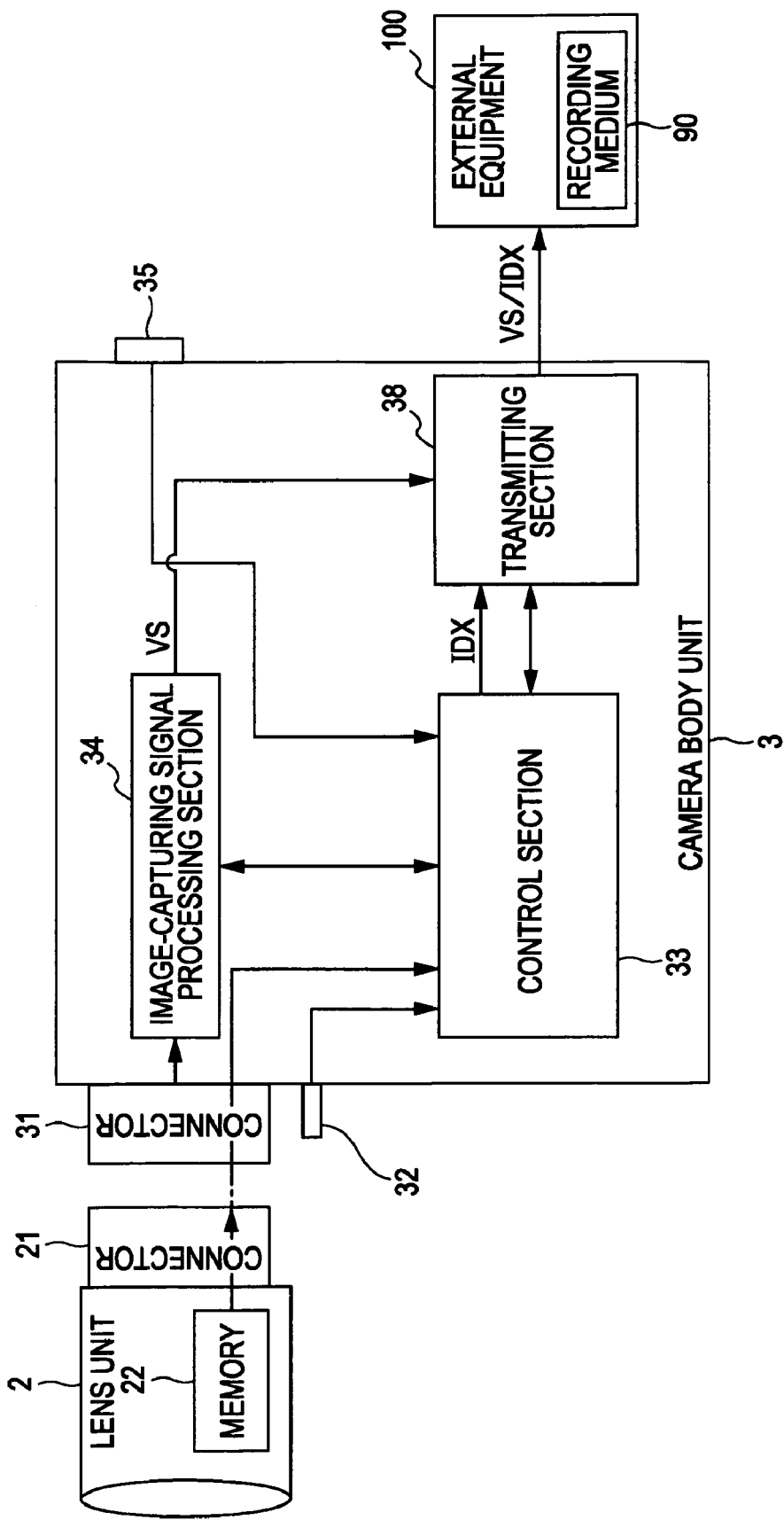
FIG. 11 is a block diagram of an image capturing apparatus according to a third embodiment.

FIG. 11 shows the configuration of the image capturing apparatus 1 according to a third embodiment.

It should be noted that the portions that are the same as those of FIG. 1 are denoted by the same symbols and repetitive description is avoided. According to the configuration in FIG. 11, a transmitting section 38 is provided instead of the recording/playback section 36 in FIG. 1.

The transmitting section 38 transmits data to external equipment 100. In this embodiment, the transmitting section 38 is formed as a section for transmitting an image signal VS or index data IDX to the external equipment 100.

The transmitting section 38 may be configured to transmit an image signal VS to the external equipment 100 through a line connection using a so-called image signal transmission cable (such as an analog signal line or an optical transmission cable), or may be configured to perform data transmission using a dedicated interface between the transmitting section 38 and the external equipment 100. Further, the transmitting section 38 may be configured to transmit a signal to the external equipment 100 by wireless transmission such as infrared-ray communication or Bluetooth communication, for example.

Further, the transmitting section 38 may be configured to perform wired or wireless communication via a network such as the Internet, LAN (Local Area Network), mobile telephone communication network, PHS communication network, or ad-hoc network to thereby transmit data to the external equipment 100 as a terminal on the network.

Conceivable examples of the external equipment 100 include a video recorder, an image compiler, and a general-purpose computer. It is assumed that the external equipment 100 records an image signal VS and index data IDX transmitted from the transmitting section 38 of the image capturing apparatus 1 onto the recording medium 90.

In the configuration as described above, the control section 33 of the image capturing apparatus 1 controls the operation of transmitting an image signal VS from the transmitting section 38, in accordance with a user's operation. Further, the control section 33 performs a control of generating index data IDX at a predetermined timing and causing the index data IDX to be transmitted from the transmitting section 38.

As an example of processing of the control section 33, for example, instructions related to recording in FIG. 2 may be changed to instructions related to transmission with respect to the transmitting section 38. That is, the processing of step F108 in FIG. 2 may be changed to an instruction for starting the transmission of an image signal vs. the processing of step F106 may be changed to a transmission control of index data IDX, and the processing of step F110 may be changed to an instruction for ending the transmission of an image signal VS.

Likewise, the examples of processing in FIGS. 3, 4, 5 can be also applied by changing instructions related to recording to instructions related to transmission with respect to the transmitting section 38.

Further, it is also conceivable to replace the recording/playback section 36 with the transmitting section 38 in the configuration shown in FIG. 6. In that case, the examples of processing in FIGS. 7, 8, 9, 10 can be also applied by changing instructions related to the recording of an image signal VS or index data IDX to instructions related to transmission with respect to the transmitting section 38.

By performing the above-mentioned control, an image signal VS is recorded onto the recording medium 90 in the external equipment 100 in a state with index data IDX assigned with respect to the point of an image signal VS at the time of starting recording the first time after interchange or detachment and attachment of the lens unit 2 in the image capturing apparatus 1.

[4. Example of Index Data Contents]

A description will be given below of the contents of index data IDX that can be applied to the first, second, and third embodiments described above.

As index data IDX, it is conceivable to use a sector address on the recording medium 90.

For instance, when performing a recording control of index data IDX as step F106 or the like in FIG. 2, the control section 33 sets as index data IDX the value of a sector address (physical address or logical address) on the recording medium 90 at which recording of an image signal VS is started. Then, an index number is assigned to that index data IDX and recorded onto the recording medium 90.

By performing the above-mentioned processing, for example, an index information file as shown in FIG. 12A is formed in the recording medium 90. That is, the index information file thus formed is such that every time a recording control of index data IDX is performed, an index number and index data IDX as a sector address are additionally recorded.

By recording such an index information file, when playing back from the recording medium 90, access to an image signal at an index point can be easily made by referring to a sector address.

Further, a time code may be used as index data IDX.

When performing a recording control of index data IDX as step F106 or the like in FIG. 2, for example, the control section 33 sets as index data IDX a time code assigned to an image signal and recorded onto the recording medium 90, and assigns an index number to that index data IDX for recording onto the recording medium 90.

By performing the above-mentioned processing, for example, an index information file as shown in FIG. 12B is formed in the recording medium 90. That is, the index information file thus formed is such that every time a recording control of index data IDX is performed, an index number and index data IDX as a time code are additionally recorded.

By recording such an index information file, when playing back from the recording medium 90, access to an image signal at an index point can be easily made by referring to a time code.

Further, a frame number in a moving image may be used as index data IDX.

When performing a recording control of index data IDX as step F106 or the like in FIG. 2, for example, the control section 33 sets as index data IDX a number of each frame of an image signal, and assigns an index number to that index data for recording onto the recording medium 90.

By performing the above-mentioned processing, for example, an index information file as shown in FIG. 12C is formed in the recording medium 90. That is, the index information file thus formed is such that every time a recording control of index data IDX is performed, an index number and index data IDX as a frame code are additionally recorded.

By recording such an index information file, when playing back from the recording medium 90, access to an image signal at an index point can be easily made by referring to a frame number.

Figure 13:
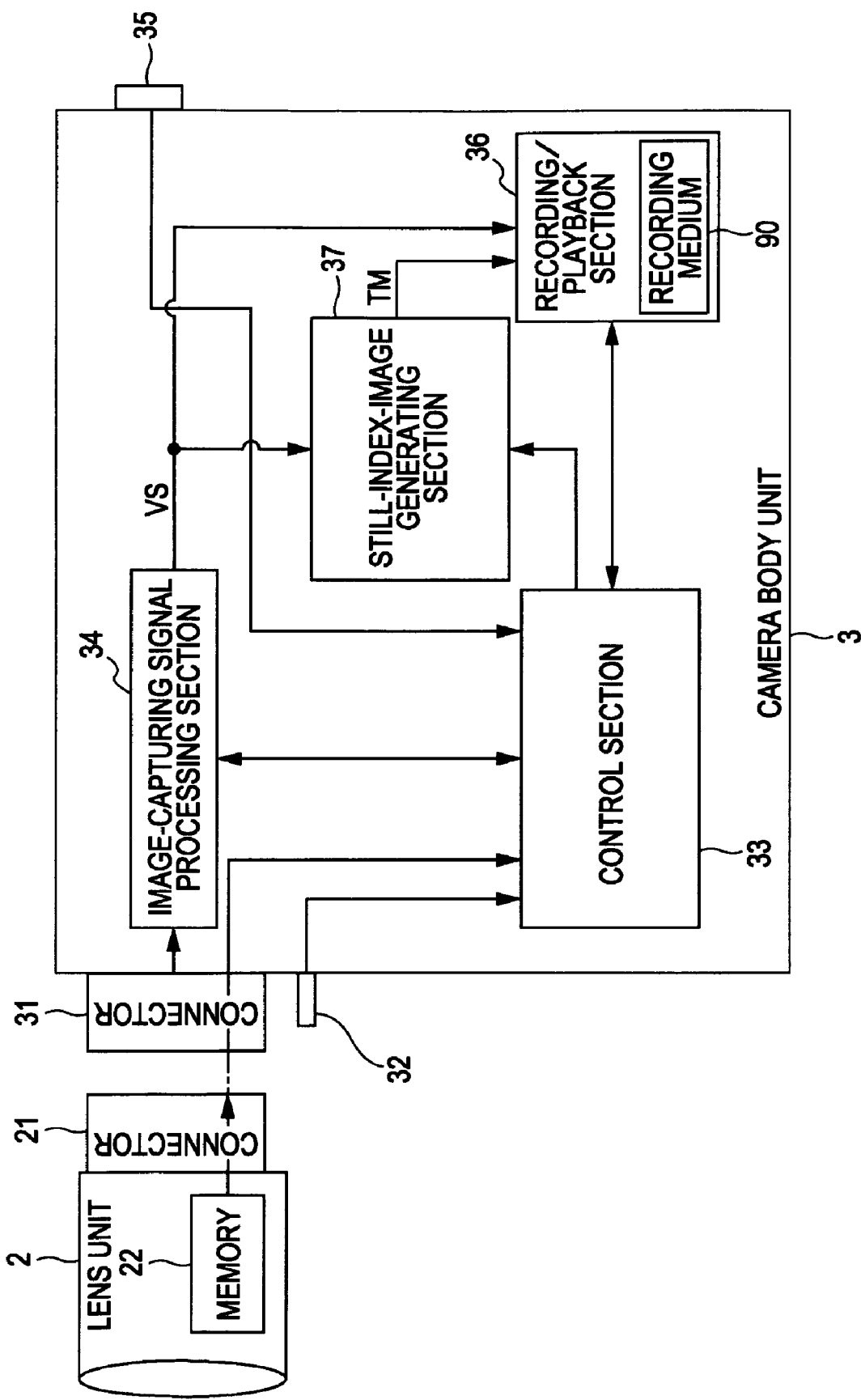
FIG. 13 is a block diagram of another example of the configuration of an image capturing apparatus according to an embodiment.

Further, a thumbnail image data (still index image data) may be used as index data IDX. For example, as shown in FIG. 13, a still-index-image generating section 37 is provided in the image capturing apparatus 1.

An image signal VS from the image-capturing signal processing section 34 is inputted to the still-index-image generating section 37. The still-index-image generating section 37 is configured to be capable of extracting an image of one frame of an image signal VS, and performing an image shrinking process to generate thumbnail image data TM for supply to the recording/playback section 36, in response to an instruction from the control section 33.

When performing a recording control of index data IDX as step F106 or the like in FIG. 2, for example, the control section 33 causes the still-index-image generating section 37 to designate a given frame, for example, the leading frame of an image signal from which recording is started, or a frame at a predetermined timing such as several seconds after the start of recording, generate thumbnail image data TM with respect to the image of that frame, and supply the thumbnail image data TM to the recording/playback section 36.

Further, the control section 33 instructs the recording/playback section 36 to record thumbnail image data TM and, for example, a frame number as an index image.

When the control section 33 performs the above-mentioned processing, for example, an index information file as shown in FIG. 14A is formed in the recording medium 90. That is, the index information file thus formed is such that every time a recording control of index data IDX is performed, an index number, and a frame number and thumbnail image data TM (TM1, TM2, and so on) as index data IDX are additionally recorded.

By recording such an index information file, when playing back from the recording medium 90, it is possible, for example, to make the user select a desired scene to be accessed by displaying a list of pieces of thumbnail image data TM. In addition, when a given thumbnail image is specified by the user, access to an image signal at the specified index point can be easily made.

It should be noted that a configuration may be adopted in which, as shown in FIG. 14B, pieces of thumbnail image data TM1, TM2, and so on are recorded in given areas on the recording medium 90, and thumbnail pointers, which point to addresses at which pieces of thumbnail image data TM corresponding to individual index numbers are recorded, are recorded in an index information file. That is, in this example, an index information file and thumbnail image data TM are recorded as separate files.

Further, in the index information file shown in FIGS. 14A and 14B, sector addresses or time codes as index points may be recorded instead of frame numbers.

While the example of index information file in FIGS. 12A and 12B, 14A and 14B adopt a file format in which index data IDX is recorded in association with an index number, an index number is not necessarily required.

Index data IDX may not necessarily be recorded in a file format as in the above example, either. For example, index data IDX in a metadata format may be included in an image signal VS. In that case in particular, a configuration is also conceived in which index data IDX is added simply as flag data indicating an index point. For example, as a forming process of index data IDX, the control section 33 performs a process of adding as index data IDX a flag indicating an index point on an image signal VS.

Further, in a case where a flag is added as index data IDX in this way, a configuration is also conceived in which after the flag is recorded onto the recording medium 90 in the recording/playback section 36 in FIG. 1, 6 or in the external equipment in FIG. 11, thumbnail image data is generated by extracting a frame on the basis of the flag to generate thumbnail image data, or an index information file as shown in FIGS. 12A and 12B, 14A and 14B is generated.

[5. Example of Index Data Recording]

Next, a description will be given of an example of the recording locations on the recording medium 90 where an image signal VS and index data IDX are recorded.

Figure 15A:
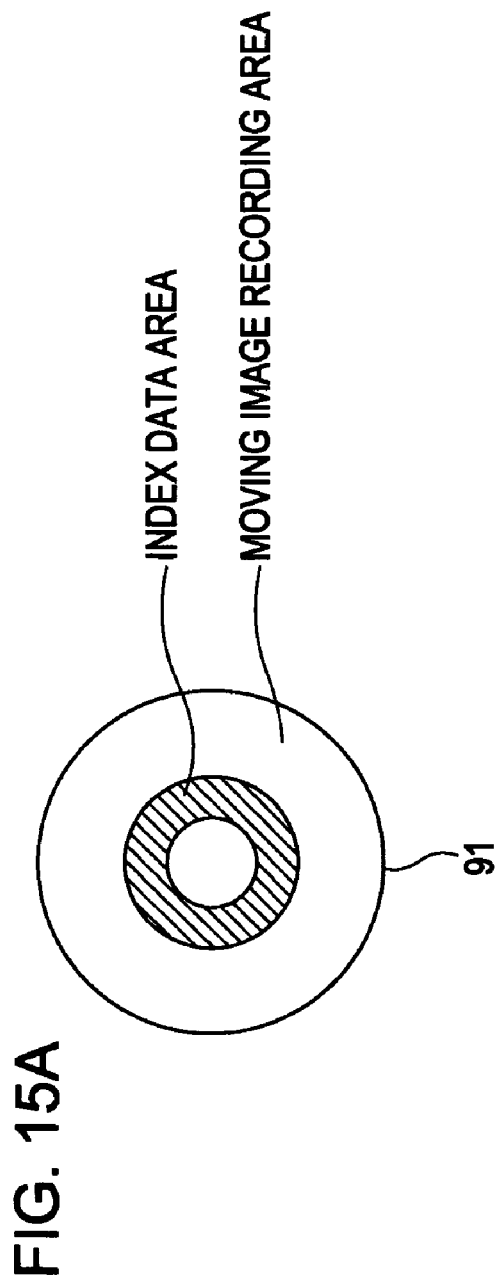
FIGS. 15A and 15B are explanatory diagrams of the recording locations of an image signal and index data according to an embodiment.

FIG. 15A schematically shows recording locations in a case where the recording medium 90 is an optical disc 91. In this example, the recording area for index data IDX and the recording area for a moving image are set as separate areas on the disc. For example, the index information file as shown in FIGS. 12A and 12B, 14A and 14B is recorded in the index data recording area.

Figure 15B:
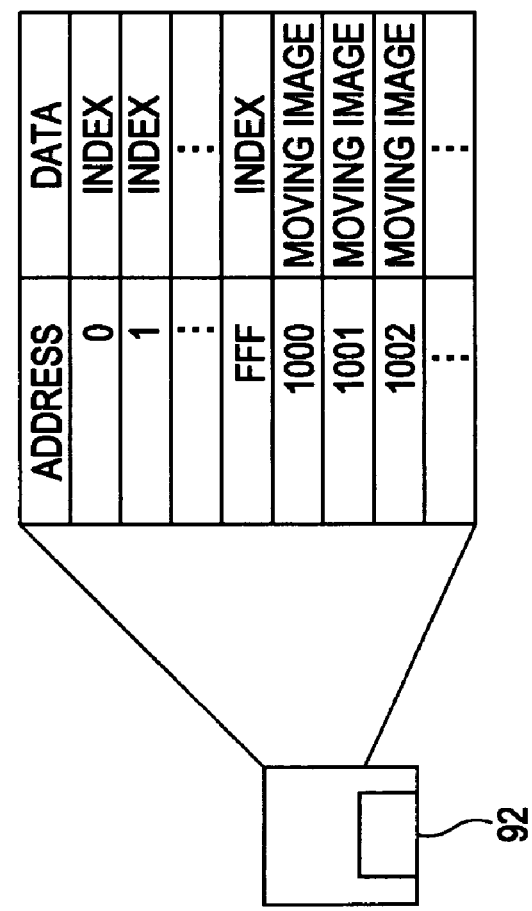

FIG. 15B shows a case in which the recording medium 90 is a solid-state memory 92. Examples of the solid-state memory 92 in this case include a memory card with a built-in flash memory.

In this case, for example, the range from the address 0 to the address FFF is used as the recording area for the solid-state memory 92 such as a flash memory, and the area from the address 1000 onwards is used for recording an image signal VS as a moving image.

FIGS. 16A and 16B schematically show a case in which both the optical disc 91 and the solid-state memory 92 are used as the recording medium 90. For example, in the configuration shown in FIG. 1, 6, the recording/playback section 36 is configured to have a disk drive with respect to the optical disc 91 and a recording/playback processing section with respect to the solid-state memory 92, and be capable of recording to and playing back from each of the optical disc 91 and the solid-state memory 92.

According to the example shown in FIG. 16A, an image signal VS is recorded onto the optical disc 91, and index data is recorded into the solid-state memory 92. For example, the control section 33 can control the disk drive so as to obtain index data IDX by reading the index data IDX from the solid-state memory 92, and then access an image point indicated by the index data IDX on the optical disc 91.

Conversely, according to the example shown in FIG. 16B, index data IDX is recorded onto the optical disc 91, and an image signal VS is recorded into the solid-state memory 92.

It should be noted that if the optical disc 91 is of a type accommodated inside a cartridge, there is also conceived a recording medium 90 in which the solid-state memory 92 is accommodated inside a cartridge. Further, there also exists a recording medium 90 in which the solid-state memory 92 is accommodated inside a magnetic tape cartridge.

In the case of such a recording medium 90, it is also suitable to record an image signal VS and index data IDX in the optical disk 91 and the solid-state memory 92 inside the cartridge as shown in FIGS. 16A and 16B.

Figure 17A:
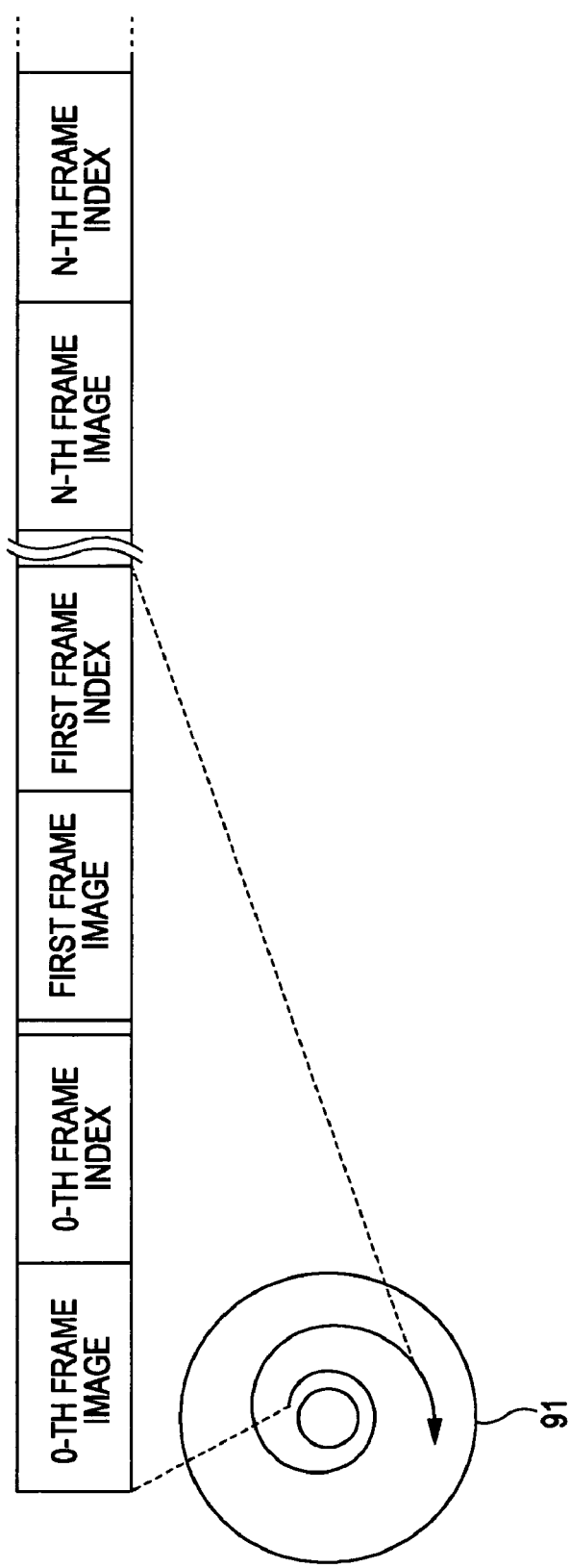
FIGS. 17A and 17B are explanatory diagrams of the recording locations of an image signal and index data according to an embodiment.
Figure 17B:
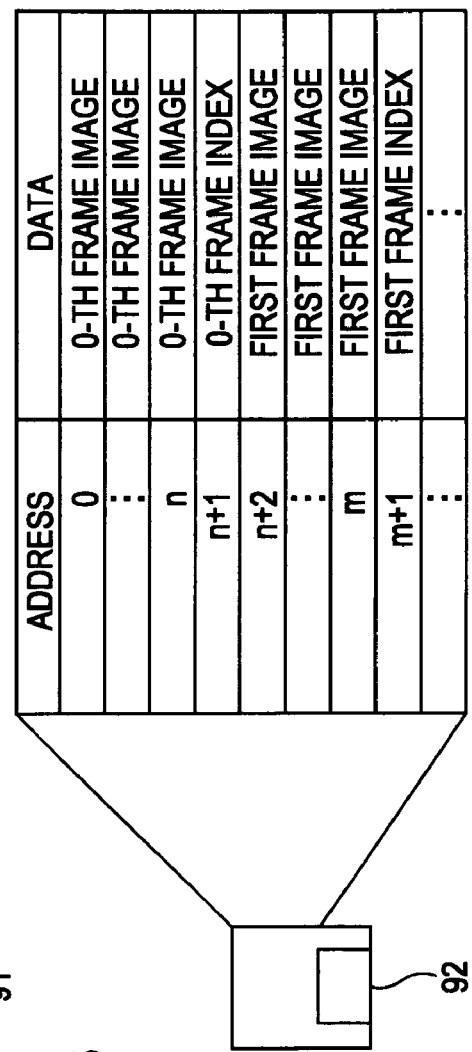

FIGS. 17A and 17B show a case in which an image signal VS and index data IDX are mixed into a series of data stream for recording.

FIG. 17A shows a case in which when recording an image signal VS onto the optical disc 91, index data IDX is recorded as information added on a frame-by-frame basis, for example.

Further, FIG. 17B shows a case in which when recording an image signal VS into the solid-state memory 92, index data IDX is recorded as information added on a frame-by-frame basis, for example.

Figure 18:
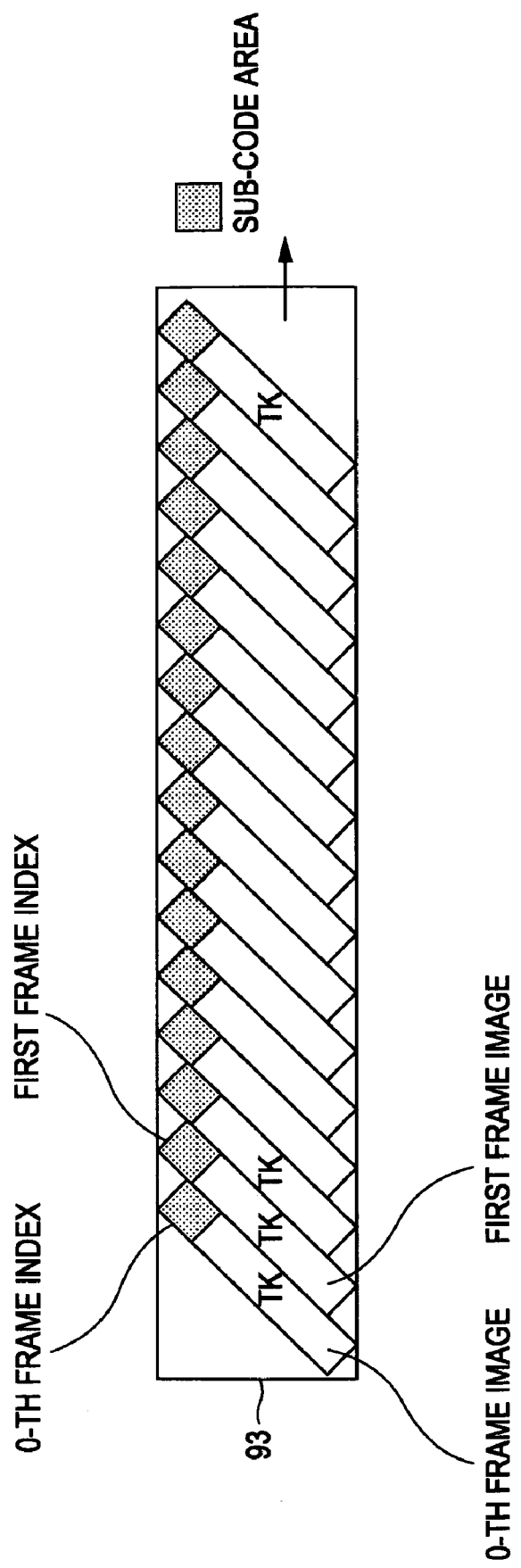
FIG. 18 is an explanatory diagram of the recording locations of an image signal and index data according to an embodiment.

FIG. 18 shows a case in which the recording medium 90 is a magnetic tape 93. Helical-scan type recording tracks TK are formed in the magnetic tape 93, and one frame of an image signal VS is recorded by each individual one of these recording tracks TK. A sub-code area is provided in each track TK, and index data with respect to each frame is recorded in this sub-code area.

It should be noted that in a case where index data IDX is added on a frame-by-frame basis as shown in FIGS. 17A and 17B, 18, the above-described index information file may be recorded for each individual frame, or index data IDX may be formed in the manner of flag data so that a value as a valid flag is recorded by one frame (or a plurality of frames) serving as an index point, and a value as an invalid flag is recorded with respect to each of the other frames.

[6. Advantages of Embodiments and Program]

According to the embodiments mentioned above, in response to interchanging or detaching and attaching of the lens, index data IDX is assigned to the captured image signal VS and recorded onto the recording medium 90. Alternatively, the image signal VS is transmitted to the external equipment 100 for recording.

Therefore, in the image capturing apparatus 1 whose lens unit 2 can be attached and detached, appropriate index data IDX for image retrieval is generated with respect to the captured image signal VS. This realizes efficient data access when playing back an image signal VS, allowing for suitable viewing or editing of an image.

In the case of the first embodiment, in particular, index data IDX is assigned when the lens unit 2 has been interchanged, and this index data IDX indicates a point where the image capturing scene has clearly changed in an image signal VS. Therefore, at the time of checking a moving image after image capture or the like, the location where the image capturing conditions have changed can be quickly accessed.

In the case of editing a captured moving image as well, random access can be made to the point where the lens unit 2 used for image capture was interchanged. Therefore, an optical correction process (image distortion or color correction process due to an aberration or the like) that varies for each lens can be performed successively on an index-by-index basis, thereby achieving an improvement in editing efficiency.

In the case of the second embodiment, index data IDX is assigned when the lens unit 2 has been detached and attached irrespective of whether the lens unit 2 is the same or not. In this regard, when the lens is removed and attached again, it is likely that the location of image capture has been moved. That is, index data IDX is assigned to a point where the image capturing scene has changed in an image signal VS.

Therefore, at the time of checking a moving image after image capture or the like, the location where the image capturing conditions have changed can be quickly accessed.

Even in the case of a system in which a captured image signal VS is transmitted to the external equipment 100 and recorded onto the recording medium 90 in a separate apparatus as in the third embodiment, an image point after interchanging or detaching and attaching of the lens unit 2 on the image capturing apparatus 1 side is reflected as index data IDX on the recording medium 90, thus allowing for suitable playback or editing.

A program according to an embodiment is a program for the processing of the control section 33 described above. That is, the program causes the control section 33 as a microcomputer (processor) to execute the various examples of processing as shown in FIGS. 2, 3, 4, 5, 7, 8, 9, 10.

Such a program can be recorded in advance in a personal computer, an HDD as a recording medium built in equipment such as an image capturing apparatus, a ROM inside a microcomputer having a CPU, a flash memory, or the like.

Alternatively, the program may be stored (recorded) temporarily or permanently in a removable recording medium such as a flexible disc, a CD-ROM (Compact Disc Read Only Memory), an MO (Magnet optical) disc, a DVD (Digital Versatile Disc), a Blue-ray disc, a magnetic disc, a semiconductor memory, or a memory card. Such a removable recording medium can be provided in the form of so-called package software.

Other than being installed into a computer from a removable recording medium, the program according to an embodiment can be downloaded from a download site via a network such as a LAN (Local Area Network) or the Internet.

It should be understood by those skilled in the art that various modifications, combinations, sub-combinations and alterations may occur depending on design requirements and other factors insofar as they are within the scope of the appended claims or the equivalents thereof.

What is claimed is:

1. An image capturing apparatus whose lens unit can be attached to and detached from a camera body section, comprising:
    an image-capturing signal processing section that generates an image signal by performing an image capturing process of subject light introduced via the lens unit;
    an attachment detecting section that generates a detection signal indicating whether or not the lens unit is attached to the camera body section; and
    a control section that determines, after detection of a recording start operation, whether or not the lens unit has been interchanged or detached and attached by using the detection signal, and performs a process of forming index data with respect to the image signal on the basis of a result of the determination,
    wherein the control section determines whether the lens unit has been interchanged or detached and attached by using the detection signal and identification information of the lens unit that is being attached, and upon determining that the lens unit has been interchanged the control section stores the identification information in the image capturing apparatus.

2. The image capturing apparatus according to claim 1, further comprising a recording section that records the image signal onto a recording medium, wherein:
    as the process of forming index data, the control section causes the recording section to record index data with respect to the image signal recorded in the recording section, onto the recording medium after interchange or detachment and attachment of the lens unit.

3. The image capturing apparatus according to claim 1, further comprising a transmitting section that transmits the image signal generated by the image-capturing signal processing section to external equipment, wherein:
    as the process of forming index data, the control section causes the transmitting section to transmit index data with respect to the image signal transmitted from the transmitting section, to the external equipment after interchange or detachment and attachment of the lens unit.

4. The image capturing apparatus according to claim 1, wherein the control section determines whether or not the lens unit has been interchanged or detached and attached by comparing the identification information of the lens unit that is being attached to lens identification information stored in the image capturing apparatus.

5. The image capturing apparatus according to claim 1, wherein the control section determines whether or not the lens unit has been detached and attached by monitoring a change in the detection signal, and upon determining that the lens unit has been detached and attached, the control section performs the process of forming index data with respect to the image signal.

6. The image capturing apparatus according to claim 1, wherein the control section performs a control of generating still image data used for retrieving the image signal.

7. An image capturing method for an image capturing apparatus whose lens unit can be attached to and detached from a camera body section, comprising the steps of:
    generating an image signal by performing an image capturing process of subject light introduced via the lens unit;
    determining, after detection of a recording start operation, whether or not the lens unit has been interchanged or detached and attached by using a detection signal indicating whether or not the lens unit is attached to the camera body section and identification information of the lens unit that is being attached;
    performing a process of forming index data with respect to the image signal generated by the image capturing process, on the basis of a result of the determination of whether or not the lens unit has been interchanged or detached and attached; and
    storing the identification information of the lens unit that is being attached in the image capturing apparatus if the identification information of the lens unit that is being attached does not match backup identification information previously stored in the image capturing apparatus.

8. A computer readable medium having a program for causing a control section to execute an image capturing method for an image capturing apparatus whose lens unit can be attached to and detached from a camera body section, the image capturing method comprising the steps of:
    generating an image signal by performing an image capturing process of subject light introduced via the lens unit;
    determining, after starting a recording operation, whether or not the lens unit has been interchanged or detached and attached by using a detection signal indicating whether or not the lens unit is attached to the camera body section and identification information of the lens unit that is being attached; and
    performing a process of forming index data with respect to the image signal generated by the image capturing process, on the basis of a result of the determination of whether or not the lens unit has been interchanged or detached and attached; and
    overwriting backup identification information previously stored in the image capturing apparatus with the identification information of the lens unit that is being attached in the image capturing apparatus if the identification information of the lens unit that is being attached does not match the backup identification information.

* * * * *